No. 712,624. Patented Nov. 4, 1902.
D. WARNER.
DIRT OR MUD GUARD FOR VEHICLES.
(Application filed July 10, 1902.)
(No Model.)
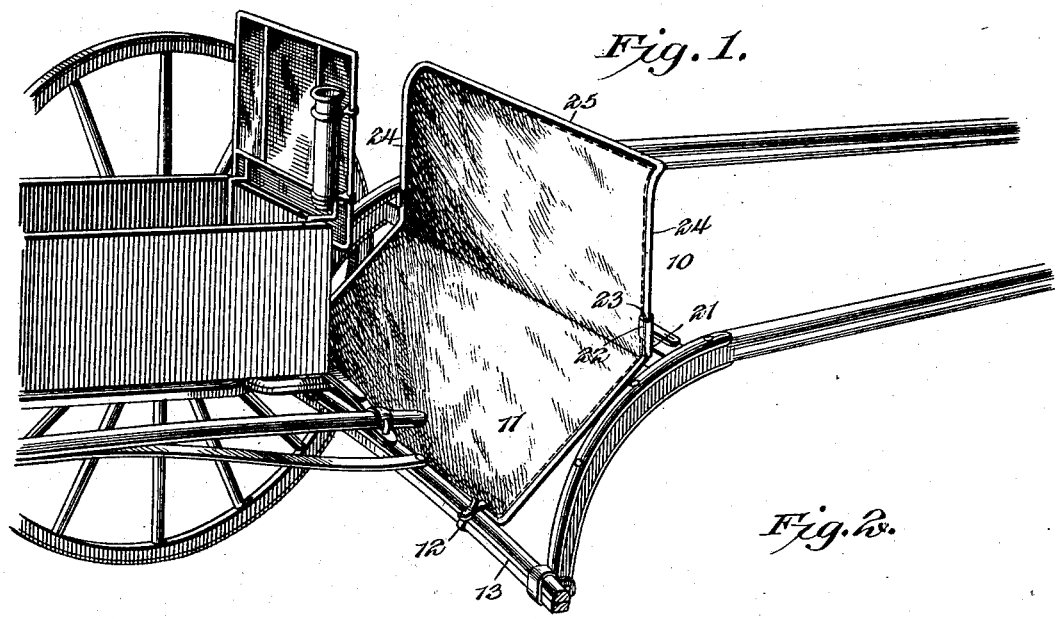
Fig. 1.
Fig. 2.
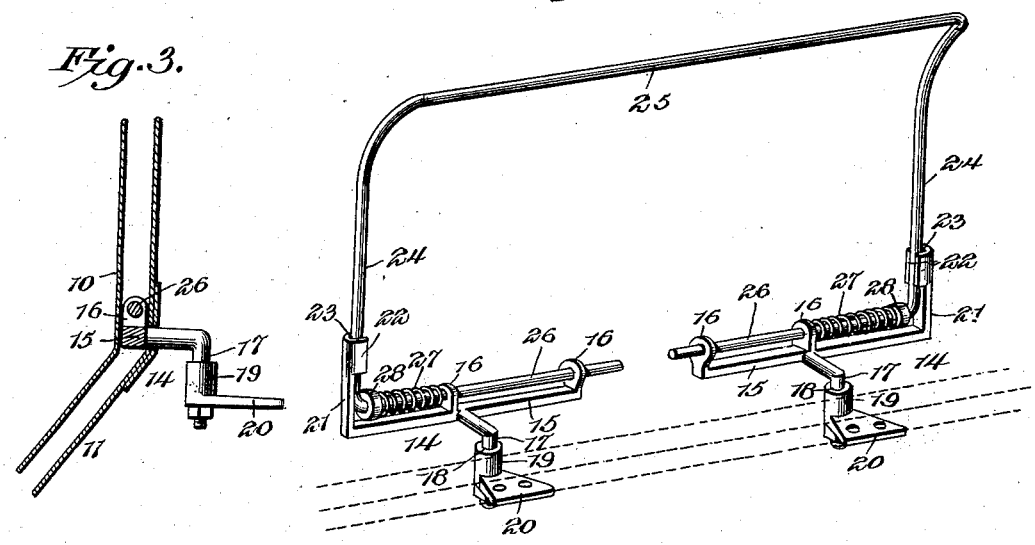
Fig. 3.
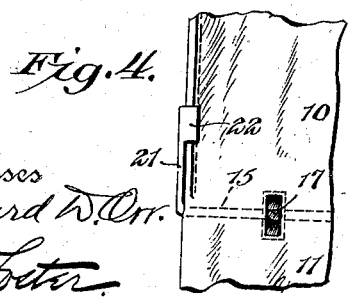
Fig. 4.
Witnesses
Howard W. Orr
B. G. Foster
Daniel Warner, Inventor,
By E. G. Siggers
Attorney
THE NORRIS PETERS CO., PHOTO-LITHO., WASHINGTON, D. C.

UNITED STATES PATENT OFFICE.

DANIEL WARNER, OF BRONSON, MICHIGAN.

DIRT OR MUD GUARD FOR VEHICLES.

SPECIFICATION forming part of Letters Patent No. 712,624, dated November 4, 1902.

Application filed July 10, 1902. Serial No. 115,040. (No model.)

*To all whom it may concern:*

Be it known that I, DANIEL WARNER, a citizen of the United States, residing at Bronson, in the county of Branch and State of Michigan, have invented a new and useful Dirt or Mud Guard for Vehicles, of which the following is a specification.

The present invention relates to improvements in dirt and mud guards for vehicles, and more particularly that class described and claimed in a former patent granted to me on May 9, 1899, and numbered 624,713. In the structure set forth in that patent there is employed an auxiliary or supplemental dashboard that is pivotally supported on the cross-bar of a pair of shafts and is arranged to be supported in an upright or in a lowered position. With this board there is associated an apron that extends from the cross-bar to the front axle. The structure constitutes a stop against which the mud and dirt thrown from the animal's feet strikes, thus protecting the occupants of the vehicle from the same. In order to secure the dashboard in its upright or operative position, frictional clamping means were employed which have not proven entirely satisfactory; and the object of the present invention is to provide novel means which will positively lock the dashboard in its upright position, said means being so constructed that there are no loose parts which may become detached and lost.

The preferred embodiment of the invention is fully illustrated in the accompanying drawings; but it will be noted that the claims hereto appended are broad enough to cover various modifications and changes from the structure shown.

In the drawings, Figure 1 is a perspective view of a portion of a vehicle with the improved guard attached thereto. Fig. 2 is a perspective view of the guard-frame. Fig. 3 is a vertical longitudinal sectional view. Fig. 4 is a detail view of one of the lower corners of the dashboard.

Similar numerals of reference designate corresponding parts in all the figures of the drawings.

In the embodiment of the invention shown a supplemental dashboard 10 is employed, which is applied to the cross-bar of a pair of shafts, though it will be evident that it may be fastened to other styles of vehicles and in different positions—as, for instance, upon the whiffletree of a vehicle-pole. An apron 11 is also employed, which is secured at its front edge to the lower portion of the dashboard, its rear edge being fastened by means of straps 12 to the front axle 13 of the vehicle.

So far as thus described the construction is quite similar to that shown in my former patent, though there are differences, as metallic bars were fastened to the apron at its opposite edges in the patented structure, whereas they are now dispensed with. The particular feature of the present invention relates to the means for supporting the dashboard and fastening it in its upright position. This means is preferably constructed as follows: A pair of spaced supporting-brackets 14 are employed, comprising horizontal pivot-bars 15, that are provided with upstanding ears 16, having alined openings therethrough. These brackets are provided with intermediately-disposed depending shanks 17, that fit in sockets 18, formed in fastening devices 19, which are secured to the underside of the cross-bar of the shafts, said fastening devices having lugs 20, which rest against said underside and through which are passed screws or other suitable fasteners. The brackets, furthermore, have at their outer ends upstanding fingers 21, provided on their inner faces with spaced vertical flanges, forming therebetween seats 23.

The dashboard is made up of a wire frame covered by a sheathing of rubber cloth or other suitable fabric. The frame consists of spaced upright standards 24, connected at their upper ends by a cross-bar 25 and having at their lower ends inwardly-extending alined journal-stems 26, which are pivotally and slidably mounted in the ears 16 of the brackets. The standards 24 when in their upright position are arranged to engage in the seats 23 of the fingers, as clearly shown in Fig. 2, and in order to maintain them in their interlocked positions with the fingers coiled springs 27 surround the stems 26 and abut against stops 28, secured to said stems, these springs urging the standards outwardly and into their locking engagement.

When traveling slowly or over hard roads or paved streets where there is no danger of dirt or mud being thrown, the supplemental dashboard 10 is lowered, exactly as in the former case. This can be readily accomplished by pressing the standards inwardly until they are disengaged from the seats of the fingers, whereupon the frame can swing downwardly, as will be readily understood. When traveling at high speed or when the roads are muddy, the dashboard may be fastened in its vertical position.

The advantages for this construction will be obvious. A firm and positive interlocking engagement is provided between the dashboard and the supporting means therefor, so that there is no liability of said dashboard becoming accidentally unfastened and dropping. Furthermore, the greater part of the locking mechanism is entirely housed within the covering or sheathing, so that the dashboard when in place provides an almost unbroken exterior, with the exception of the fingers and the flanges thereof.

While the device is shown as attached to the front portion of a buggy, it will be evident that it may be applied to sleighs, and in case of a team a pair of the guards would be used, one fastened behind each horse.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a guard of the class described, the combination with a dashboard member, of a fastening member for pivotally supporting the dashboard member upon a vehicle, and mechanism for holding the dashboard against movement, said mechanism comprising a seat arranged in one member and means constituting a part of the other member and detachably engaging in the seat.

2. In a guard of the class described, the combination with a dashboard, of fastening means for pivotally supporting the dashboard upon a vehicle and being provided with a seat, said board having an element that detachably engages in the seat to hold the dashboard against movement.

3. In a guard of the class described, the combination with a supplemental dashboard, of fastening means for pivotally securing the same to the shafts or analogous portion of a vehicle in front of the body, said board and fastening means having a yielding and detachable interlocking engagement whereby the board may be held against its pivotal movement.

4. In a guard of the class described, the combination with a dashboard, of fastening means for pivotally securing the board to the shafts or analogous portions of a vehicle in front of the body, said means and board having a yielding and detachable interlocking engagement to hold the latter against its pivotal movement, an apron secured to the board, and means for fastening the rear portion of the apron to the vehicle.

5. In a guard of the class described, the combination with a dashboard-frame, of fastening means for pivotally supporting the frame upon a vehicle, said frame having a yielding portion that detachably interlocks with the fastening means to hold said frame against movement.

6. In a guard of the class described, the combination with a support having a seat, of a dashboard-frame having a standard pivoted to the support and movable into and out of the seat thereof.

7. In a guard of the class described, the combination with a support having an upstanding finger provided with a seat, of a dashboard-frame having a standard pivoted to the support and movable into and out of the seat of the finger.

8. In a guard of the class described, the combination with a support having an upstanding finger provided with a seat, of a dashboard-frame having a standard pivoted to the support and movable into and out of the seat of the finger, and a spring for urging the standard into the seat.

9. In a guard of the class described, the combination with a supporting-bracket having an upstanding finger provided with a seat in its inner face, of means for attaching the bracket to a vehicle, a dashboard-frame slidably and pivotally mounted upon the bracket and having a standard that is movable into and out of the seat of the finger.

10. In a guard of the class described, the combination with a supporting-bracket comprising a pivot-bar and an upstanding finger having a seat in its inner face, of a dashboard-frame having a journal-stem slidably and pivotally mounted upon the pivot-bar, and a standard that is movable into and out of the seat of the finger.

11. In a guard of the class described, the combination with supporting means, of a dashboard-frame having a pivotal and sliding connection with the supporting means, said frame having a detachable and interlocking engagement with the supporting means.

12. In a guard of the class described, the combination with spaced supporting-brackets having upstanding ears and fingers provided with seats in their inner faces, of a dashboard-frame comprising spaced standards connected by a cross-bar and having inwardly-extending journal-stems at their lower ends that pivotally and slidably engage the ears of the bracket, said standards being movable into and out of the seats of the fingers, and coiled springs surrounding the stems to urge the standards into said seats.

In testimony that I claim the foregoing as my own I have hereto affixed my signature in the presence of two witnesses.

DANIEL WARNER.

Witnesses:
F. M. RUDD,
R. D. STRANY.